United States Patent [19] [11] 3,786,507
Hurd, Jr. [45] Jan. 15, 1974

[54] VEHICLE ANTI-COLLISION SYSTEM
[76] Inventor: Calvin F. Hurd, Jr., 2176 Delaware Dr., Cleveland Heights, Ohio
[22] Filed: Nov. 11, 1971
[21] Appl. No.: 197,742

[52] U.S. Cl. ................ 343/7 ED, 340/33, 340/104
[51] Int. Cl. ............................................. G01s 9/02
[58] Field of Search ................ 343/7 ED, 8; 180/98; 340/33, 104

[56] References Cited
UNITED STATES PATENTS
3,442,347  5/1969  Hodgson et al. ............. 343/7 ED X
2,974,304  3/1961  Nordlund ............................ 340/33

Primary Examiner—T. H. Tubbesing
Attorney—Joseph M. Fitzpatrick et al.

[57] ABSTRACT

A doppler radar is mounted to face rearwardly of a roadway vehicle and to respond only to reflected radar signals from objects, e.g., following vehicles, which approach at a predetermined closing velocity, and an indicator for signalling both to the following driver by means of lights on the radar equipped vehicle and to the driver of the radar equipped vehicle itself.

11 Claims, 3 Drawing Figures

VEHICLE ANTI-COLLISION SYSTEM

This invention relates to detection and signalling systems and in particular, it concerns a novel method and apparatus for signalling the occurrence of dangerous conditions in the operation of a motor vehicle.

One of the most frequent types of highway accidents, particularly on turnpikes, expressways and other high speed roads, is the rear end collision. It is believed that a driver's judgment relative to the time-to-impact with a leading vehicle going at a slower speed, is decreased at higher speeds. Drivers are taught to think in terms of distances; and while it may be possible to judge the distance of a leading vehicle with some degree of accuracy, the effect of this distance on time-to-impact is considerably different at high speeds than it is at low speeds. Unless a driver is particularly alert when driving at high speeds, he loses his sense of time-to-impact and he may not recover it in time to take corrective action. It is not unknown, for example, for an automobile to be driven directly into the rear of another vehicle parked alongside a roadway. On the other hand, although a careful driver may have better time-to-impact judgment at low speeds, it often happens that drivers at low speeds tend to be less attentive and more easily distracted than they should be.

The present invention, in one aspect, is directed to overcoming the problem of rear end collisions under conditions of both high and low speed driving. The present invention is based, in part, on the discovery that a primary factor in determining the likelihood of collision is the relative or closing velocity between leading and following vehicles. According to the present invention, the closing velocity between vehicles is detected; and when that velocity exceeds a predetermined amount, a warning signal is generated.

The present invention, in another aspect, is directed to reducing ambiguities and anomalies which occur when electromagnetic-type sensing devices are used in the monitoring of vehicular traffic on roadways. Most electromagnetic sensing devices, such as radar, have an emission or a reception pattern which is substantially wider than the particular roadway lane to be monitored. Thus, indications from vehicles going in the opposite direction in other lanes or stationary objects alongside the highway tend to produce false indications, which in many cases could mask a desired indication. According to this other aspect of the present invention, a doppler-type radar is mounted facing rearwardly of a vehicle and is aimed to monitor following vehicles and to produce an output whenever the doppler effects produced by the following vehicle correspond to a closing velocity between the two vehicles of a given amount. This doppler radar arrangement will not respond to objects alongside the highway or to vehicles going in the opposite direction, since these will all have a relative opening velocity rather than a closing velocity.

As illustratively embodied, the present invention may provide a warning signal generator internally of the lead vehicle on which the radar is mounted. This will provide the driver of the lead vehicle with advance warning so that he can take corrective action, either by switching lanes, speeding up, or manually flashing a warning signal to the following vehicle. Alternatively or concurrently, a warning signal indicator, such as a flashing sign or lights, may be provided externally of the lead vehicle to provide the driver of the following vehicle with advance warning so that he can slow down or take whatever corrective action may be necessary before a collision occurs.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

A specific embodiment of the invention has been chosen for purposes of illustration and description, and is shown in the accompanying drawings, forming a part of the specification wherein.

Figure 1:
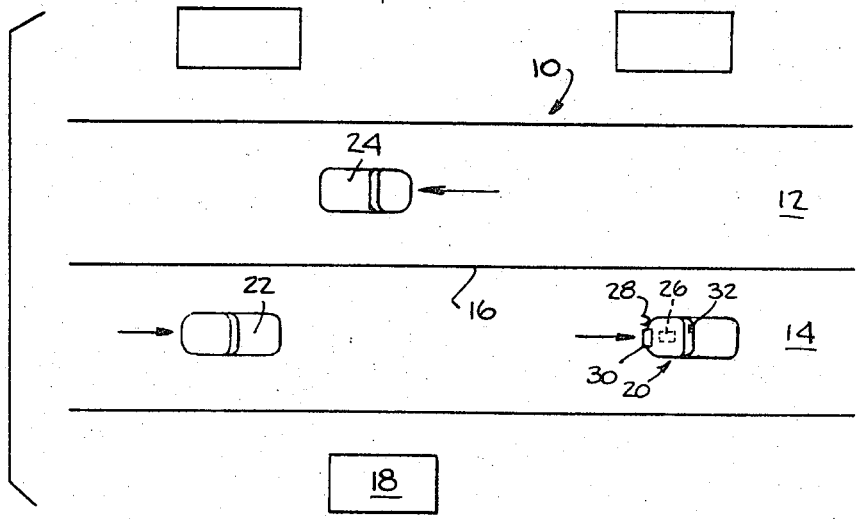
FIG. 1 is a diagramatic plan view of a two-lane roadway showing vehicles travelling thereon with one of the vehicles being equipped with a doppler radar according to the present invention.

In FIG. 1, there is shown a two-lane highway 10 which is made up of right to left lane 12 and left to right lane 14 separated by a line 16 or other appropriate divider. A building 18 is shown alongside the highway 10.

A first vehicle 20, equipped with a doppler radar and warning system according to the present invention, is shown on the left to right lane 14. The building 18 is behind the first vehicle 20. A second vehicle 22 is also shown on the left to right lane 14 some distance behind and following the first vehicle 20. A third vehicle 24 is shown on the right to left lane 12 travelling in the opposite direction from the first and second vehicles, but located between them at the present instant.

Only the first vehicle 20 is provided with any special electronic equipment for traffic control. While the other vehicles may be provided with such equipment, the system of the present invention requires only that the lead vehicle, in any direction, be electronically equipped.

As shown in FIG. 1, the first vehicle 20 is provided with a doppler radar 26 having an antenna 28 facing rearwardly of the direction in which the first vehicle moves. A rear mounted illuminated flasher sign 30 and an internal indicator 32 are shown connected to the doppler radar 26.

Figure 2:
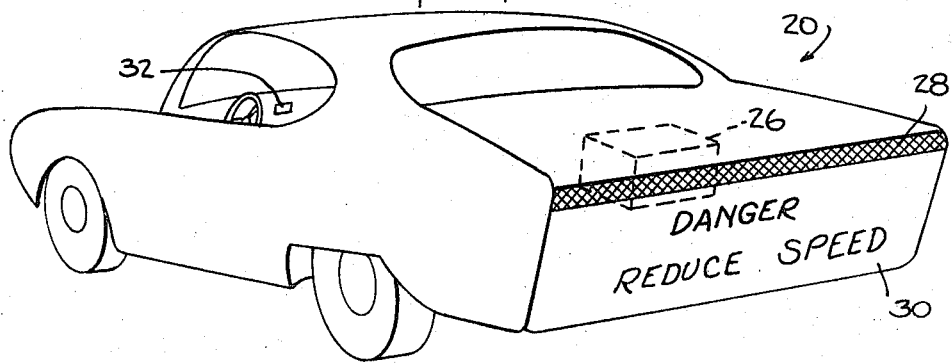
FIG. 2 is a fragmentary perspective view of the rear of an automobile outfitted with a doppler radar and warning indicator system of the present invention.

Turning now to FIG. 2, it will be seen that the first vehicle 20 is of conventional construction except that the radar antenna 28 has been incorporated into its trunk lid and that the flasher sign is mounted on the rear face of the trunk lid just under the antenna 28. The doppler radar 26 (shown in dotted outline) is mounted inside the trunk of the vehicle. Also, the internal indicator 32 is shown mounted on the vehicle's dashboard.

Figure 3:
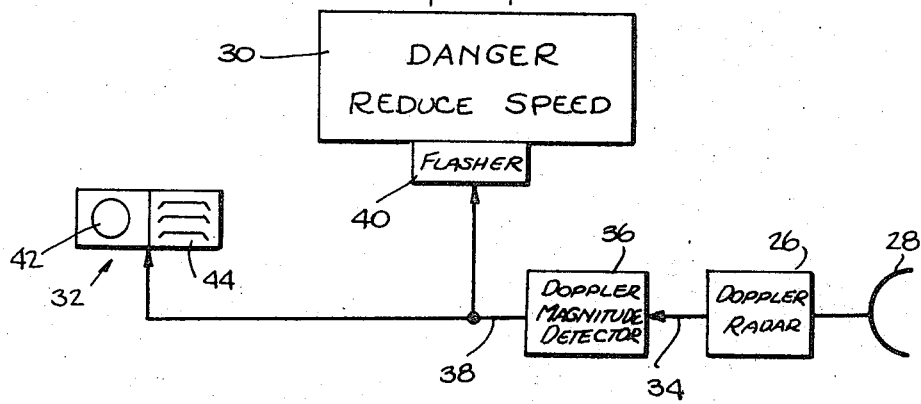
FIG. 3 is a block diagram of a doppler radar and warning indicator system used in the vehicle of FIG. 2.

The block diagram of FIG. 3 shows the interconnection of the various electronic elements of the doppler radar warning system. As can be seen, the antenna 28 is connected to the doppler radar. This radar operates to produce output signals on an output line 34 corresponding to the doppler effects present in received reflected radar signals. The magnitude of the signals on the line 34 correspond to the degree of doppler effect which, in turn, corresponds to the relative velocity between the antenna 28 and the object from which radar signals are being reflected.

A signal magnitude detector 36 is connected to the output line 34 and operates to produce an indicator signal on an indicator line 38 whenever the magnitude of the signal on the line 34 corresponds to our exceeds that corresponding to a given predetermined relative velocity between the antenna 28 and a following vehicle.

The indicator line 38 is connected to a flasher 40 which, in turn, is connected to the illuminated flasher sign 30. Whenever signals appear on the indicator line 38, the flasher 40 will be activated to turn the illuminated flasher sign on and off. As can be seen in FIG. 2, the sign 30 is quite large in relation to the vehicle 20, and its flashing should provide ample notice to the driver of a following vehicle. If desired, appropriate lettering, e.g., DANGER - REDUCE SPEED, may be provided on the sign. Also if desired, the tail lights of the vehicle itself may be flashed on and off instead of the sign 30.

The indicator line 38 is also connected to the internal indicator 32. As can be seen in FIG. 3, the indicator 32 includes a light 42 and a horn 44, either or both of which may be set to be activated by signals on the indicator line. This will warn the driver of the lead vehicle 20 at the same time that the illuminated flasher sign 30 is warning the driver of the following vehicle 22 that the closing velocity of the two vehicles is beyond a safe magnitude.

In operation of the above-described system, the first vehicle 20 travels along the left to right lane 14, as indicated in FIG. 1, while its doppler radar 26 operates to emit signals continuously rearwardly of the vehicle 20 via the antenna 28. These signals are reflected off all objects behind the first vehicle, including the building 18, the third vehicle 24 and the second vehicle 22. At this same time, this doppler radar continuously monitors for the presence at the antenna 28 of reflected radar signals possessing doppler components corresponding to a closing velocity, that is, corresponding to an object coming closer to the first vehicle. The doppler effect produced on a radar signal by a reflecting object which approaches the source of the signal, is seen as an increase in the received reflected signal frequency as compared to the transmitted frequency. On the other hand, the doppler effect produced on a radar signal by a reflecting object which moves away from the source of the signal, is seen as a decrease in the received reflected frequency as compared to the transmitted frequency. This effect is quite analogous to that produced by the whistle of a train which passes a person standing alongside a track. As the train approaches, the whistle appears to have a higher pitch, while after the train has passed the person and moves away from him, the whistle appears to have a lower pitch. To one riding on the train, no change in pitch at all is perceptible.

The doppler radar 26 thus responds only to reflected frequencies which are somewhat higher than the transmitted frequency. This corresponds to objects which are approaching the first vehicle 20. Now the building 18 is stationary with respect to the highway 10, but with respect to the first vehicle 20, it is effectively moving away, so that its effect on the radar signals which it reflects is to decrease their frequency. Accordingly, the doppler radar 26 will not respond to signals reflected off the building 18. It will be appreciated also that prior to the first vehicle's passing the building 18, i.e., when the relative velocity between the vehicle and the building was such that they were coming together and the reflected radar frequency should be higher than the transmitted frequency, no signal was produced by the radar 26 because the building 16 during that time was forwardly of the vehicle 20 whereas, the radar antenna 28 is oriented in a rearward direction.

The radar signals reflected off the third vehicle 24 will not cause the radar 26 to produce an output for the same reasons given above. Actually, because the third vehicle 24 is moving in the opposite direction, the reflected radar frequency from it will be even lower than that from the building 18.

The radar signals reflected off the second vehicle 22 will have no effect on the radar 26 so long as the second vehicle is travelling at the same speed or more slowly than the first or lead vehicle 20. In these cases, the reflected radar frequency will be equal to or less than the transmitted frequency. Should the second vehicle 22 begin to approach the lead vehicle, i.e., when its forward velocity becomes greater than that of the lead vehicle (which may be due either to the second vehicle 22 speeding up or to the first vehicle 20 slowing down), then the reflected radar frequency will be greater than the transmitted frequency. When this difference in frequencies exceeds a predetermined magnitude, an indication signal is produced to operate the sign 30 and the internal indicator 32.

It will be appreciated from the foregoing that the system of the present invention prevents ambiguity among several targets in a vehicular traffic monitoring system using electromagnetic waves. Also, the system of the present invention is relatively uncomplicated and is inexpensive to construct. It may be used effectively on any vehicle regardless of whether the same or similar equipment is mounted on other vehicles. Further, since the system operates independently of distance, it is not affected by nearby traffic moving at the same rate of speed.

Having thus described the invention with particular reference to the preferred form thereof, it will be obvious to those skilled in the art to which the invention pertains, after understanding the invention, that various changes and modifications may be made therein without departing from the spirit and scope of the invention, as defined by the claims appended hereto.

What is claimed is:

1. A method for signalling the occurrence of dangerous conditions in the operation of a roadway vehicle, said method comprising the steps of continuously emitting electromagnetic energy rearwardly of the direction in which the vehicle travels, monitoring rearwardly of the vehicle for the reflection, from following vehicles, of the emitted electromagnetic energy, selectively detecting in the monitored electromagnetic energy only the presence of doppler effects caused by the closing speed between said roadway vehicle and one of said following vehicles exceeding a predetermined amount, and generating a warning indication in response to such detection.

2. A method according to claim 1, wherein said detecting includes the step of responding only to reflected electromagnetic energy having a frequency which is higher, by a predetermined amount, than the emitted electromagnetic energy.

3. A method according to claim 1, wherein the step of generating a warning indication includes the step of producing a signal which is visible externally of the vehicle rearwardly thereof.

4. A method according to claim 1, wherein the step of generating a warning indication includes the step of producing an alarm indication capable of alerting the driver of the vehicle.

5. In combination, a roadway vehicle, a doppler radar mounted on said raodway vehicle to face rearwardly thereof, said radar being operative to produce output signals in response to the occurrence of reflected radar waves having doppler components corresponding to a predetermined closing velocity between said roadway vehicle and a following vehicle, warning indicator means operative in response to said output signals to signal the occurrence of said closing velocity and doppler magnitude indicator means connected between said doppler radar and said warning indicator means, said doppler magnitude indicator means being operative to prevent output signals except where said signals represent a closing velocity greater than said predetermined closing velocity.

6. A combination according to claim 5, wherein said doppler radar is operative to produce outputs only in response to the occurrence of reflected radar waves whose frequency is higher than the frequency transmitted by said radar.

7. A combination according to claim 5, wherein said warning indicator means comprises an illuminated sign mounted on the rear of said vehicle to shine rearwardly thereof.

8. A combination according to claim 7, wherein said illuminated sign is provided with a flasher to turn same on and off in rapid sequence upon activation thereof.

9. A combination according to claim 5, wherein said warning indicator means includes alarm means mounted inside said vehicle for alerting its driver.

10. A combination according to claim 9, wherein said alarm means includes an audible signal generator.

11. A combination according to claim 9, wherein said alarm means includes a light.

* * * * *